US011367368B2

(12) United States Patent
Simmons

(10) Patent No.: US 11,367,368 B2
(45) Date of Patent: Jun. 21, 2022

(54) ELECTRONIC DISPLAY WITH DEFORMABLE SURFACE

(71) Applicant: Universal City Studios LLC, Universal City, CA (US)

(72) Inventor: Kyle Simmons, Orlando, FL (US)

(73) Assignee: Universal City Studios LLC, Universal City, CA (US)

(*) Notice: Subject to any disclaimer, the term of this patent is extended or adjusted under 35 U.S.C. 154(b) by 405 days.

(21) Appl. No.: 16/546,008

(22) Filed: Aug. 20, 2019

(65) Prior Publication Data

US 2021/0012689 A1 Jan. 14, 2021

Related U.S. Application Data

(60) Provisional application No. 62/873,464, filed on Jul. 12, 2019.

(51) Int. Cl.
*G09F 9/37* (2006.01)
*G09F 9/33* (2006.01)
*H04N 13/32* (2018.01)
*G09F 19/18* (2006.01)
(Continued)

(52) U.S. Cl.
CPC .......... *G09F 9/372* (2013.01); *G09F 9/305* (2013.01); *G09F 9/33* (2013.01); *G09F 9/375* (2013.01); *G09F 19/02* (2013.01); *G09F 19/18* (2013.01); *H04N 13/32* (2018.05)

(58) Field of Classification Search
CPC . G09F 9/372; G09F 9/305; G09F 9/33; G09F 9/375; G09F 19/02; G09F 19/18; H04N 13/32
See application file for complete search history.

(56) References Cited

U.S. PATENT DOCUMENTS 4,654,989 A 4/1987 Fleming
6,189,246 B1 * 2/2001 Gorthala .................. G09F 7/06
40/427
(Continued)

FOREIGN PATENT DOCUMENTS

CN 101887660 A 6/2010
CN 202275255 U 6/2012
(Continued)

OTHER PUBLICATIONS

Son, Choonghyun et al., A Flexible Mutlimodulal Tactile Display Array For Virtual Shape And Texture, Springer-Verlag Berlin Heidelberg 2015, Jul. 31, 2015, vol. 22, No. 10, pp. 2587-2594.
(Continued)

*Primary Examiner* — Gary C Hoge
(74) *Attorney, Agent, or Firm* — Fletcher Yoder P.C.

(57) ABSTRACT

A three-dimensional (3D) display system may include a peg array of multiple pegs. Each peg may be individually addressable and designed to move along one or more axes. The 3D display system may also include an induction array having multiple electromagnetic coils to generate electromagnetic fields. The electromagnetic fields may induce magnetic forces upon at least one peg to cause the peg to move along an axis into an actuated position. The 3D display may also include a display screen to be distended into a 3D topography via contact with at least one peg in the actuated position.

19 Claims, 8 Drawing Sheets

(51) Int. Cl.
*G09F 19/02* (2006.01)
*G09F 9/305* (2006.01)

(56) References Cited

U.S. PATENT DOCUMENTS

| | | | | |
|---|---|---|---|---|
| 6,462,840 | B1* | 10/2002 | Kravtsov | G09F 9/33 |
| | | | | 358/474 |
| 6,625,088 | B1* | 9/2003 | Mah | G04B 19/207 |
| | | | | 368/230 |
| 9,958,767 | B1 | 4/2018 | Reichow et al. | |
| 10,748,460 | B1* | 8/2020 | Siegel | H04N 9/3185 |
| 2003/0130817 | A1* | 7/2003 | Page | B29C 33/307 |
| | | | | 702/155 |
| 2005/0098044 | A1* | 5/2005 | Spedden | G09B 21/004 |
| | | | | 99/325 |
| 2005/0151761 | A1* | 7/2005 | Hillis | G09F 9/372 |
| | | | | 345/108 |
| 2005/0230365 | A1* | 10/2005 | Lei | H01L 21/76898 |
| | | | | 219/121.71 |
| 2005/0231309 | A1* | 10/2005 | Lee | B43L 1/045 |
| | | | | 335/78 |
| 2007/0132778 | A1* | 6/2007 | Gallen | G09F 9/305 |
| | | | | 345/600 |
| 2008/0171308 | A1 | 7/2008 | Shin | |
| 2009/0231287 | A1* | 9/2009 | Rogowitz | G06F 3/016 |
| | | | | 345/173 |
| 2012/0133494 | A1 | 5/2012 | Cruz-Hernandez et al. | |
| 2012/0279812 | A1* | 11/2012 | Peters | G05B 19/4099 |
| | | | | 188/67 |
| 2013/0265260 | A1 | 10/2013 | Seo et al. | |
| 2014/0104047 | A1* | 4/2014 | Bolzmacher | G06F 3/016 |
| | | | | 340/407.2 |
| 2014/0320431 | A1 | 10/2014 | Cruz-Hernandez et al. | |
| 2015/0124475 | A1* | 5/2015 | Suhr | G09F 23/0066 |
| | | | | 362/555 |
| 2015/0248960 | A1* | 9/2015 | Khan | H01F 7/064 |
| | | | | 361/143 |
| 2018/0113510 | A1 | 4/2018 | Jentsch | |
| 2021/0280100 | A1* | 9/2021 | Bitton | G09F 19/02 |

FOREIGN PATENT DOCUMENTS

| | | |
|---|---|---|
| JP | 2006023676 A | 1/2006 |
| KR | 20190081114 A | 7/2019 |

OTHER PUBLICATIONS

Streque, J. et al., Elaboration and Test of High Energy Density Magnetic Micro-Actuators for Tactile Display Applications, Procedia Chemistry 1, Sep. 1, 2009, vol. 1, No. 1, pp. 694-697.
PCT/US2020/041014 Invitation to Pay Additional Fees dated Nov. 11, 2020.

* cited by examiner

ELECTRONIC DISPLAY WITH DEFORMABLE SURFACE

CROSS-REFERENCE TO RELATED APPLICATIONS

The present application claims the benefit of U.S. Provisional Application No. 62/873,464, entitled "ELECTRONIC DISPLAY WITH DEFORMABLE SURFACE" and filed Jul. 12, 2019, the disclosure of which is incorporated herein by reference for all purposes.

BACKGROUND

The disclosure relates generally to an electronic display with a deformable surface, and more specifically to systems and methods for providing images on an electronically controllable three-dimensional (3D) surface.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Display technologies may be implemented to provide a viewer with an image of perceived depth to generate an illusion using an image that is projected onto a planar or two-dimensional (2D) surface (e.g., a projection screen). Some 3D systems use worn devices such as glasses or goggles to separate the vision of the viewer's eyes from each other to aid in creating such an effect. In general, a 3D display may provide a viewer with a realistic, exciting, and/or more immersive experience. However, because the projected images on which the 3D illusion is based are planar, without parallax and dynamic shadow casting that are characteristic of objects with depth, the illusion of realistic depth is diminished.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a three-dimensional (3D) display system may include a peg array of multiple pegs. Each peg may be individually addressable and designed to move along one or more axes. The 3D display system may also include an induction array having multiple electromagnetic coils to generate electromagnetic fields. The electromagnetic fields may induce magnetic forces upon at least one peg to cause the peg to move along an axis into an actuated position. The 3D display may also include a display screen to be distended into a 3D topography via contact with at least one peg in the actuated position.

In another embodiment, a 3D display may include a peg array with multiple of pegs and a peg driving system to actuate at least one of the pegs from a first position to a second position such that the peg array forms a particular topography. The 3D display may also include an optics generator to emit light from the surface of the pegs. Further, the emitted light from each of pegs may aggregate to form an image corresponding to the particular topography.

In yet another embodiment, a method for providing a 3D display may include supplying current to one or more electromagnetic coils to induce magnetic forces in one or more pegs of a peg array. The induced magnetic forces may then motivate the pegs to positions associated with a topography. The method may also include illuminating one or more light sources disposed on the tip, side, or both of each of the pegs to display at least a portion of an image. The method may also include coordinating movement of the pegs and illumination of the light sources such that the image corresponding to the topography is displayed while the pegs are in positions associated with the topography.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
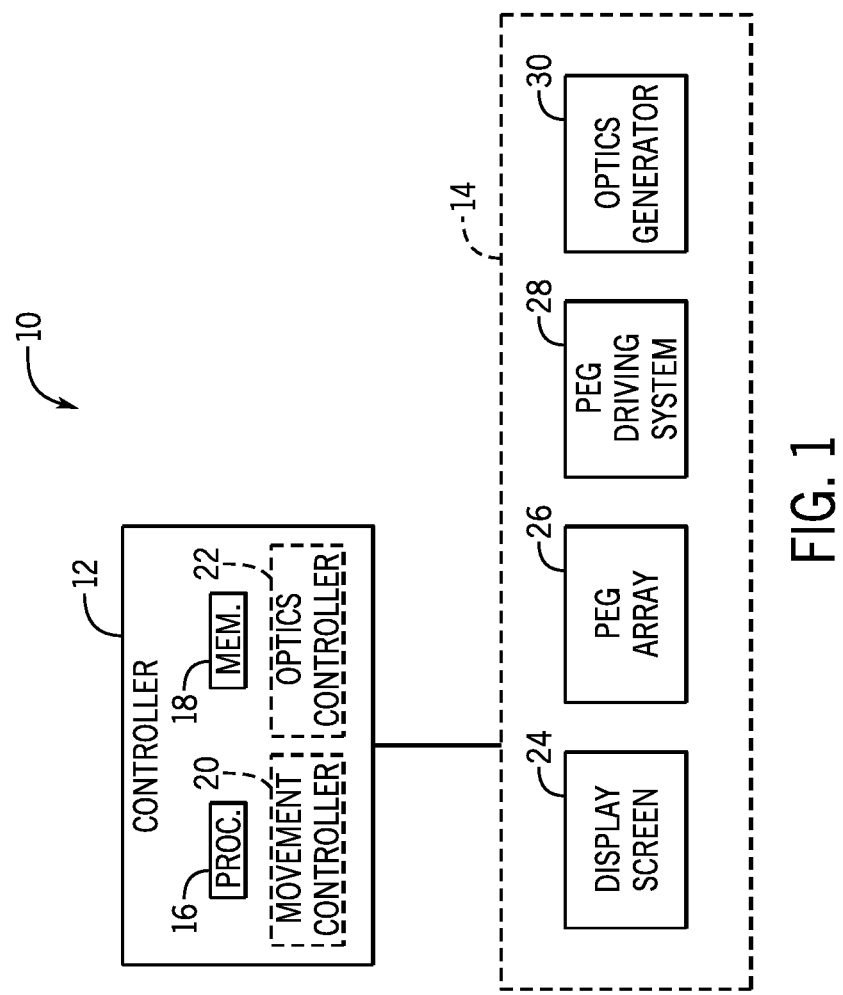
FIG. 1 is a block diagram of an example 3D display system, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Creating realistic immersive environments with projected or displayed media is complex. The media may be rendered as a 3-dimensional (3D) illusion, viewable through 3D glasses or similar. However, while the illusion may hold for a viewer in a static position, the illusion tends to break down at the edges and at more extreme angles. While 3D projections are often used in the context of theaters, in which the seats are in predictable locations that have desirable viewing angles for holding the illusion, immersive environments are often more interactive. The viewers move relatively freely within the environment and view the displayed images at a variety of angles, including the more extreme angles. An additional challenge to generating 3D illusions in an immersive environment is that planar projections do not cast dynamic shadows that a viewer expects to see. Further, planar projections lack parallax effect, i.e., do not change in appearance when viewed from different angles. Accordingly, it is desirable to create more robust 3D illusions in such environments.

Projection mapping onto irregular or shaped surfaces may create additional depth. However, projection mapping techniques involve static or motionless projection surfaces. Further, projection mapping includes complex scanning and alignment processes before the illusion can be rendered, and misalignment of the surface features and the projected images will break the illusion. In some instances, live actors may push on a flexible screen to create life size impressions. However, such implementations may prove labor intensive and/or limit the potential for having a dynamic video or picture displayed on the screen simultaneously with the changing topography.

The present techniques facilitate 3D display techniques with improved characteristics that contribute to the perception of depth and that do not rely on complex image alignments to provide a viewer with a realistic, exciting, and/or more immersive experience. As such, in some embodiments, a display with a 3D surface and a configurable or variable topography may be implemented to improve the viewing experience. Moreover, the 3D display may depict images corresponding to the variable topography. For example, as a person's face is optically displayed on a screen of the 3D display, the screen may extend toward a viewer with the general topography of a human face simultaneously. The simultaneous changing of the screen topography in conjunction with a stream of images (e.g., video) may yield an improved user experience with increased reality and/or 3D definition. That is, the projected image is embedded with the deformed surface.

To cause such movement of the 3D display, an array of actuatable elements, such as moveable pegs, may be disposed behind a flexible display screen. The individual actuatable elements may be individually addressable to move individually or in groups to press against and position the display screen at various points to create a varying topography across the flexible display screen. Each element, individually or in groups, may be operated by a driver to push and/or pull the display screen from its 2D (e.g., flat) resting position (e.g., a neutral position) to generate the 3D topography.

Additionally, the 3D display may include an optics generator to provide images to be displayed on the flexible display screen. In some embodiments, one or more projectors may be utilized to project the images onto the viewing side of the flexible display screen. In some scenarios, multiple projectors may be used to reduce shadows cast by the topography of the screen. Additionally or alternatively, the 3D display may be backlit and/or project the images through the flexible display screen from the element-side of the flexible display screen. For example, the elements may include light emitting diodes on or around the element tips and/or fiber optic cables that terminate at the element tips. As should be appreciated, the 3D display may be of any suitable size depending on implementation. For example, the 3D display may be "life size," such as on a wall of a room or building or "travel size" such as built into a personal handheld device.

With the foregoing in mind, FIG. 1 is a block diagram of an example 3D display system 10 including a controller 12 and a 3D display 14. The controller 12 may assist in operational control of the 3D display 14 and/or processing of images and/or depth data to coordinate the dynamic topography with the images to be displayed. As such, the controller 12 may include a processor 16, memory 18, a movement controller 20, and/or an optics controller 22. The processor 16 may include one or more general purpose microprocessors, one or more application specific integrated circuits (ASICs), one or more programmable logic devices such as field programmable gate arrays (FPGAs) and programmable array logic (PAL) devices, or any combination thereof. The memory 18 may be any suitable memory for the storage of data to be processed by the processor 16, and may include one or more tangible, non-transitory, computer-readable mediums. For example, the memory 18 may include random access memory (RAM), read only memory (ROM), rewritable non-volatile memory such as flash memory, hard drives, optical discs, and/or the like. As should be appreciated, the functions of the controller 12 may be accomplished via a single device or spread out among multiple devices. For example, the movement controller 20 may be separate from the optics controller 22.

The 3D display 14 may include a display screen 24, an array of actuatable elements, illustrated here as a peg array 26, a peg driving system 28, and an optics generator 30. As discussed herein, the display screen may be pushed and/or pulled from an equilibrium position by pegs of the peg array 26 to vary the topography the display screen 24. Moreover, the peg array 26 may include multiple pegs operatively moved via the peg driving system 28. The peg driving system 28 may include multiple peg drivers, alone or in conjunction with each other, to motivate the pegs to their desired positions. The peg driving system 28 and the peg array 26 may be configured such that each individual peg of the peg array 26 is individually addressable. The optics generator 30 may include one or more visual outputs such as LEDs and/or fiber optics adjacent to the display screen 24 (e.g., affixed to the tips and/or sides of the pegs).

Figure 2:
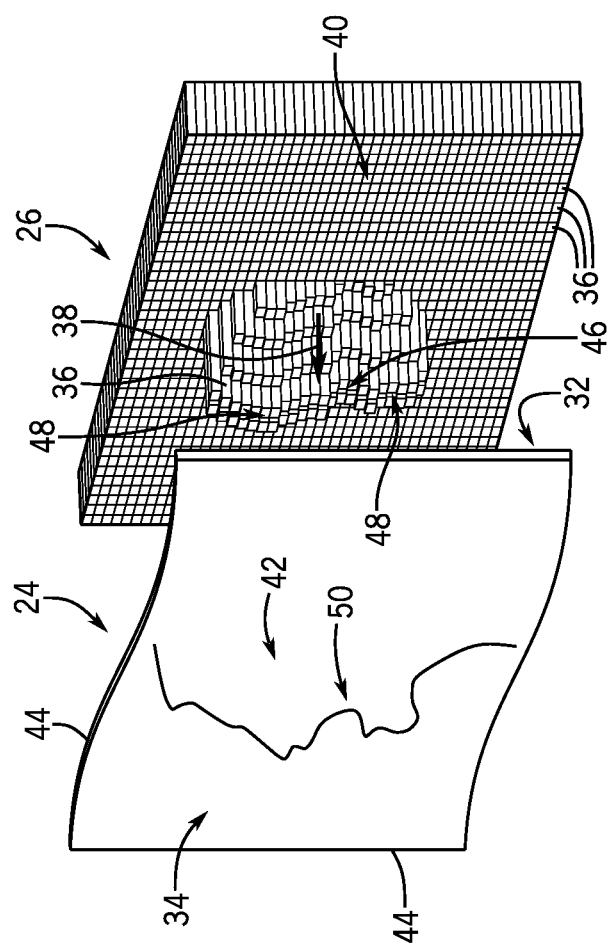
FIG. 2 is an exploded schematic view of an example peg array for shaping a display screen of the 3D display system of FIG. 1, in accordance with aspects of the present disclosure.

To help illustrate, FIG. 2 is an exploded schematic view of an example peg array 26 for shaping a display screen 24. In general, the display screen 24 may include an elastic material such as spandex or other stretchable material. Furthermore, when utilized in conjunction with a rear sided (e.g., emanating from a rear side 32 of the display screen 24) optics generator 30, the display screen 24 may have a sufficient transmissivity to allow for images to be clearly displayed on the viewing side 34 (e.g., as from a viewing area) of the display screen 24. For example, in one embodiment, the display screen 24 may transmit greater than 50%, greater than 70%, or greater than 90% incident light from the rear side 32 to the viewing side 34 of the display screen 24. Additionally, the display screen 24 may be of a suitable thickness to withstand the pressure of the pegs 36 during deformation while maintaining elasticity and, in some embodiments, low diffusivity. For example, depending on the material used, the display screen 24 may have a diffusivity low enough to maintain a desired level of clarity of a displayed image as seen by a viewer.

The pegs 36 of the peg array 26 may be forced into the display screen 24, as shown by arrow 38, relative to pegs 36 at a neutral position 40, to produce a protrusion 42 out of the viewing side 34 of the display screen 24. As should be appreciated, the display screen 24 may be held fixed at the edges 44 of the display screen 24 to keep the display screen 24 taut. In some embodiments, by maintaining certain pegs 36 (e.g., pegs 46) with less displacement from the neutral position 40 than other nearby pegs 36 (e.g., pegs 48) with a larger displacement from the neutral position 40, the display screen 24 may exhibit concavity 50 to give the protrusion 42 improved definition. For example, in some embodiments, vacuum caused by the displacement of the pegs 36 may keep the display screen 24 from tenting around the pegs 36 having more displacement. Additionally or alternatively, the vacuum may be maintained by a pump (e.g., a mechanical vacuum pump). Furthermore, concavity 50 in the display screen 24 may, additionally or alternatively, be improved by adhering the pegs 36 to the display screen 24. In one such an embodiment, the travel of the pegs 36 may be regulated such that the adhesive bond is maintained without excess stress.

In the illustrated embodiment, the pegs 36 of the peg array 26 are generally shaped and sized identically (having a same diameter and a same length dimension, having a same cross-sectional and/or end shape) and are made from the same materials. However, it should be understood that the peg array 26 may include different sizes, materials, and/or shapes of pegs 36, depending on the desired end effects.

The protrusion 42, formed by the pegs 36 and imprinted onto the display screen 24 to be viewable on the viewing side 34, may assist in providing a realistic 3D experience for a viewer without additional hardware (e.g., 3D goggles, parallax screens, etc.). Additionally or alternatively, the protrusion 42 may be utilized as a haptic feedback such that a viewer may feel a dynamically changeable 3D model and/or view images simultaneously. For example, the protrusions 42 may simulate an interactive 3D map or provide a braille output while maintaining the ability to display images on the same surface. As should be appreciated, the display screen 24 and peg array 26 may be oriented vertically, horizontally, or at any suitable angle for achieving the desired 3D demonstration. Moreover, although stated herein as lighting the display screen 24 from the rear side 32, in some embodiments, the display screen 24 may be omitted, and the 3D imagery and topography may be viewed directly via the pegs 36. Furthermore, in some embodiments, the display screen 24 may be divided into multiple sub-screens, each covering different groupings of pegs 36. By maintaining multiple sub-screens, more exaggerated angles and/or concavity may be exhibited.

Figure 3:
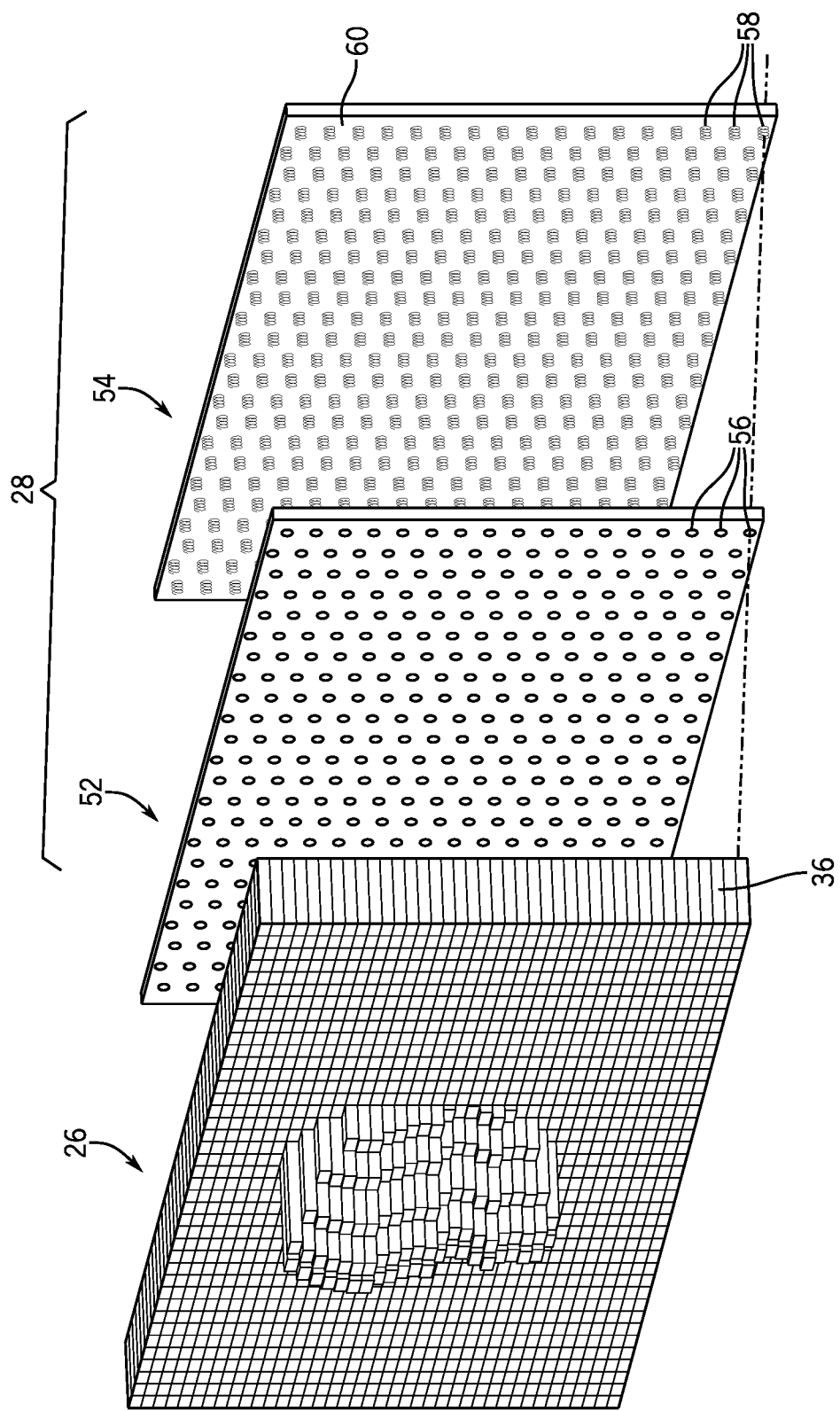
FIG. 3 is an exploded schematic view of the example peg array and an example peg driving system, in accordance with aspects of the present disclosure.

FIG. 3 is an exploded schematic view of the example peg array 26 including multiple pegs 36 and an example peg driving system 28. In some embodiments, the peg driving system 28 may include an alignment support 52 and/or an induction array 54. The alignment support 52 may include one or more holes 56 to assist in keeping the pegs 36 in-line during operation. For example, the alignment support 52 may maintain each peg 36, or a group of pegs, aligned in respective holes 56 formed through the alignment support 52, such that the pegs 36 may travel in a uniform direction and do not cross or hinder each other when disposed at or traveling to different positions. Each hole 56 may be sized and shaped to be permit each peg 36 to move in a desired direction of movement (e.g., along a single axis) while preventing movement in undesired directions (e.g., along other axes). Moreover, in some embodiments, the alignment support 52 may be flush with the neutral position 40 of the pegs 36 and/or co-planar with a plane corresponding to the neutral position 40 of the pegs. Further, the alignment support 52 may provide support for the display screen 24, for example, (e.g., via securement at the edges 44 of the display screen 24). As illustrated, the alignment support 52 provides a frame through which the pegs 36 actuate, whereby the pegs 36 are configured to move relative to the alignment support 52. While the pegs 36 are shown as moving generally orthogonally to the plane of the alignment support 52, other arrangements are also contemplated. For example, the holes 56 and the induction array may be shaped or oriented to guide motion of one or more of the pegs 36 to form an acute angle with the plane of the alignment support 52 when actuated.

Although the neutral position 40 is illustrated as being in a single plane, in some embodiments, the neutral position 40 of the pegs 36 may form a preset topography. For example, the neutral position 40 may form a generic face, body part, geological formation, or other desired topology, and the pegs 36 may be actuated from the neutral position 40 of the preset topology to facilitate dynamic changes to the topology. Moreover, in some embodiments, the alignment support 52 and/or the induction array 54 may be shaped in a non-planar fashion such that the alignment support 52 and/or the induction array 54 retain the pegs 36 at the neutral position 40 at the preset topography.

The induction array 54 may impart to and/or induce in the pegs 36 forces (e.g., electromagnetic, mechanical, etc.) for pressing against the display screen 24. In some embodiments, the induction array 54 and the alignment support 52 may be integrated into a single component.

The induction array 54 may include multiple electromagnetic coils 58 affixed to a base 60 to assist in making electromagnetic fields. Moreover, in some embodiments, the base of the induction array 54 may include a printed circuit board (PCB). As such, the electromagnetic coils 58 may be disposed and/or integrated into the base 60 and/or affixed to the base 60 for support. Moreover, depending on implementation, the base 60 may be reinforced (e.g., rPCB) for additional support. Additionally, the induction array 54 may be uniformly distributed in a single plane or be staggered. For example, in some embodiments, the electromagnetic coils 58 associated with certain pegs 36 may be at different distances from the alignment support 52 and/or the neutral position 40. Staggering the induction array 54 may provide additional space on the PCB, which may allow for a tighter peg array 26 and/or a reduction in interference between adjacent electromagnetic coils 58. In some embodiments, the electromagnetic coils 58 may be a part of linear motors such as stepper motors (e.g., a hybrid linear stepper motor, a variable-reluctance linear stepper motor, etc.) to facilitate movement of the pegs 36. Furthermore, in some embodiments, the pegs 36 may have a magnetic core and/or include one or more coils disposed thereon to facilitate direct induction movement of the pegs 36 without utilizing individual driver motors.

Figure 4:
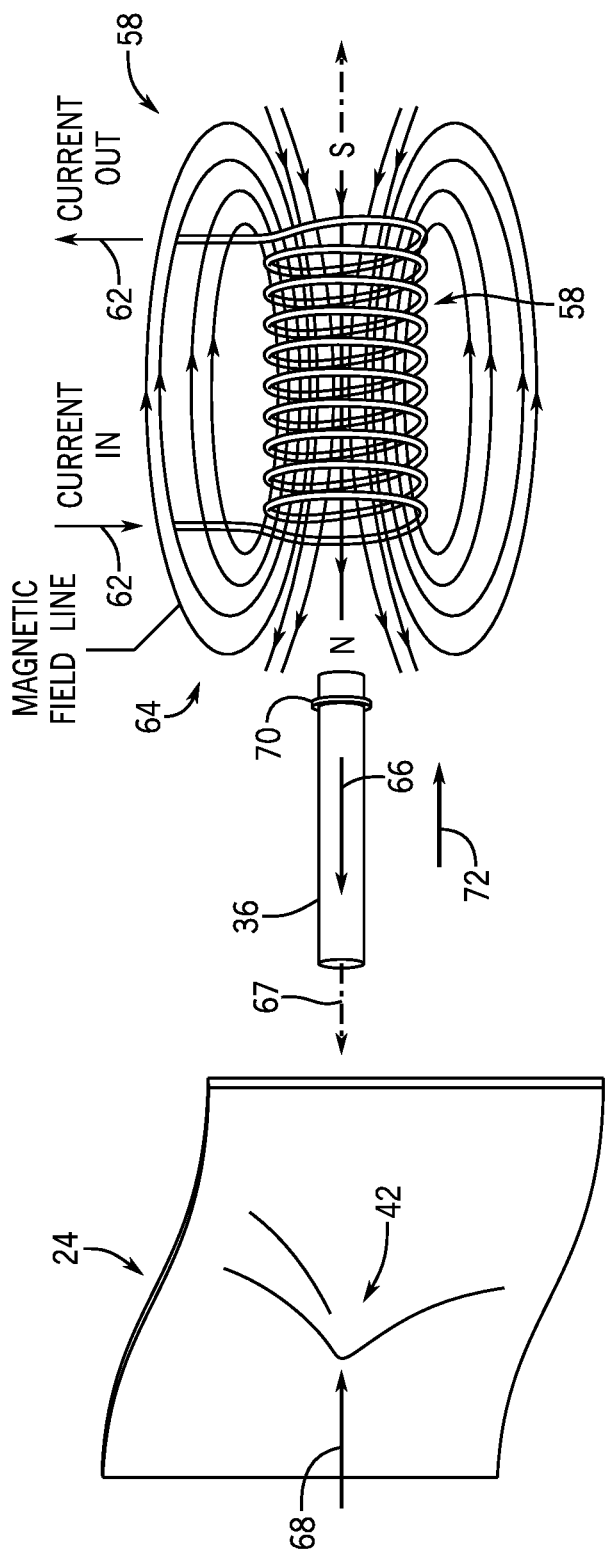
FIG. 4 is a schematic diagram of the acting forces during generation of a protrusion on a display screen, in accordance with aspects of the present disclosure.

To help illustrate, FIG. 4 is a schematic diagram of the acting forces that act on one or more individual pegs 36 during generation of a protrusion 42. While only a single peg 36 is illustrated by way of example, the disclosed embodiment may also be applied to additional pegs 36 of the peg array 26. The electromagnetic forces are tuned to cause each peg 36 to actuate to a desired position relative to the alignment support 52 (FIG. 3). For example, in one embodiment, each peg 36 may be associated with a resting or neutral position 40 and at least one actuated or protruded position representing a total range of motion of the peg 36. Further, each peg 36, in an embodiment, may be capable of assuming one or more intermediate positions between the resting and maximally actuated positions. Within the context of the peg array 26 (FIG. 2), the pegs may collectively form different patterns or shapes that correspond to the protrusion 42. Further, the protrusion 42 may be dynamic and responsive to different control instructions such that individual pegs 36 move between actuated and resting positions independent of one another to dynamically assume new patterns. As disclosed herein, the protrusion 42 may also be responsive to user input, e.g., to provide haptic feedback based on user touch.

During operation, electric current 62 may be passed through an electromagnetic coil 58 of the induction array 54 and induce an electromagnetic field 64. In some embodiments, the peg 36 may have magnetic properties (e.g., a magnetic core, magnetic rings, magnetic coils, etc.) such that the magnetic field 64 prompts a forward magnetic force 66 along the axis 67 to motivate the peg 36 out of a neutral position and into an actuated position towards the display screen 24 to form at least part of the protrusion 42. In an embodiment, the peg 36 is configured to actuate in a forward or backward direction along the axis 67 generally aligned with a longest dimension of the peg 36. The peg 36 may actuate relative to the electromagnetic coil 58, which remains generally stationary during the movement of the peg 36. Additionally, the display screen 24 may stretch and produce an opposing tension force 68 pushing the peg 36 back. Equilibrium between the tension force 68 and the forward magnetic force 66 may result in a static position of the peg 36 and the protrusion 42 from the display screen 24. The further the display screen 24 is stretched, the more tension force 68 is exhibited on the peg 36. As such, to achieve larger protrusions 42 (e.g., greater displacements from the neutral position 40) a larger forward magnetic force 66 may be generated to counter the tension force 68. To generate the larger forward magnetic force 66, the current 62 may be increased under processor control. Moreover, to create protrusions 42 of various displacements (e.g., move different pegs 36 different distances from the neutral position 40), the induction array 54 may supply different currents 62 to different electromagnetic coils 58. In some embodiments, the peg 36 may include a flange 70 to stop the peg 36 from being displaced past a threshold. For example, the flange 70 may abut the base 60 of the induction array 54 and/or the alignment support 52 when the peg 36 is at maximum displacement to keep the peg 36 from further travel. In some embodiments, restrained travel may assist in maintaining tension forces 68 below a tearing threshold to reduce wear on the display screen 24.

To return the pegs 36 back to the neutral position 40 or to a position with less displacement from the neutral position 40, the current 62 supplied to the associated electromagnetic coil 58 may be reduced or removed. For example, the current 62 may be removed from an electromagnetic coil 58 driving a peg 36, and the tension force 68 in the display screen 24 may motivate the peg 36 back to the neutral position. Additionally or alternatively, the flow of current 62 through the electromagnetic coil 58 may be reversed to create an opposite magnetic force 72. The opposite magnetic force 72 may assist in quickly returning the peg 36 to a position of less displacement or the neutral position 40. Furthermore, the ability to rapidly move the pegs 36 into and out of the display screen 24 may allow for faster changes to the protrusions 42 and, thus, the dynamic topography of the display screen 24.

Figure 5:
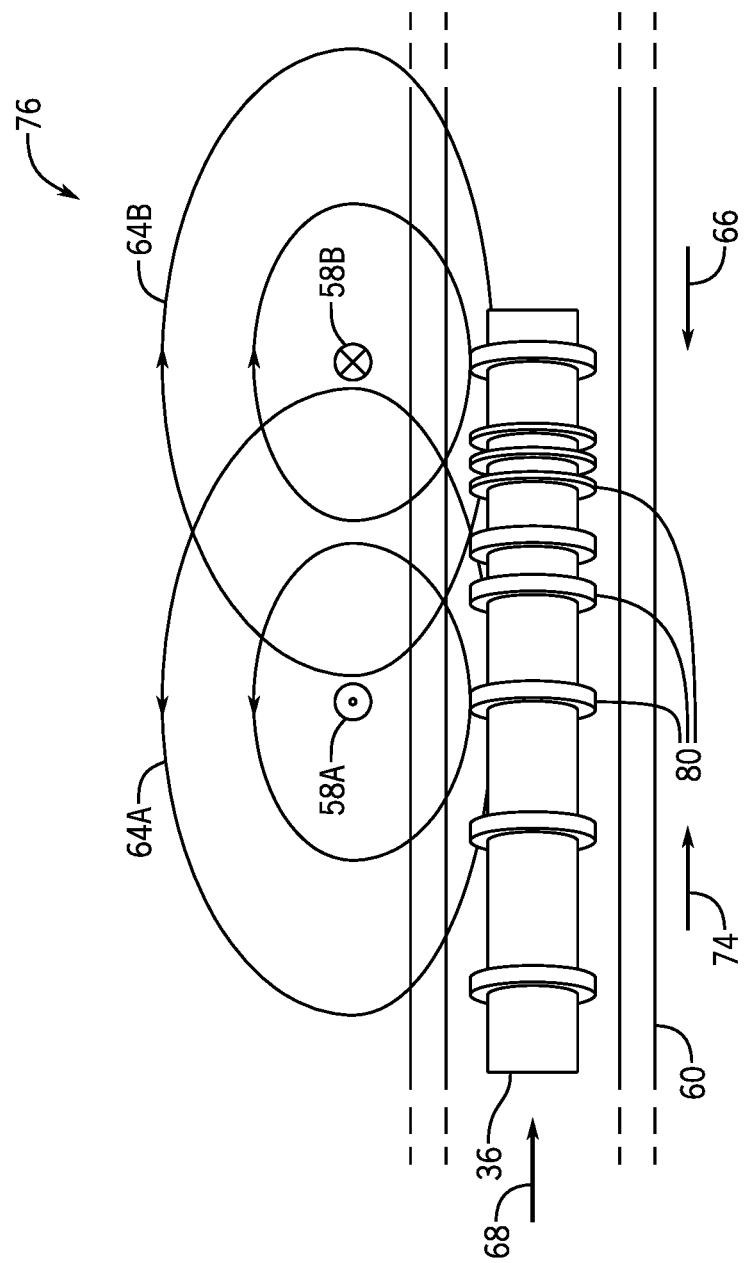
FIG. 5 is a cutaway view of an example peg acted upon by magnetic forces induced by electromagnetic coils, in accordance with aspects of the present disclosure.

Additionally or alternatively, the electromagnetic interactions between the pegs 36 and the induction array 54 may facilitate discrete intermediate positions of the pegs 36 relative to the neutral position 40. For example, instead of relying only on a force balance between the tension force 68 and the forward magnetic force 66, both the forward magnetic force 66 and a reverse magnetic force 74 may be taken into account simultaneously, along with the tension force 68, as shown by the cutaway portion 76 of the induction array 54 in FIG. 5. To achieve independent breaking positions (e.g., preset stopping positions with different displacements from the neutral position 40) for each peg 36, multiple electromagnetic coils 58 may be provided for each peg 36 in series with alternating directions of current 62. For example, a first electromagnetic coil 58A may carry current 62 in a first direction to produce a counter-clockwise electromagnetic field 64A (as shown in the reference frame of FIG. 5), and a second electromagnetic coil 58B may carry a current 62 in a second direction to produce a clockwise electromagnetic field 64B (as shown in the reference frame of FIG. 5). The electromagnetic fields 64A, 64B may then act on one or more magnetic components (e.g., a magnetic core, a magnet or magnetic coils affixed to the peg 36, etc.) of the peg 36 to impart the magnetic forces 66, 74. Due to the spacing between the electromagnetic coils 58, the current 62 in each electromagnetic coil 58 may be regulated such that the magnetic forces 66, 74 hold the peg 36 in a particular position (e.g., at a displacement from the neutral position 40). For example, the counter-clockwise magnetic field 64A may interact with one or more peg coils 80 and/or other magnetic components of the peg 36 to impart the reverse magnetic force 74. Similarly, the clockwise magnetic field 64B may interact with the peg coils 80 and/or other magnetic components of the peg 36 to impart the forward magnetic force 66. As individual peg coils 80 and/or other magnetic components get closer to an electromagnetic coil 58, the respective forward or reverse magnetic force 66, 74 increases in magnitude. Conversely, as individual peg coils 80 and/or other magnetic components are positioned further from an electromagnetic coil 58, the respective forward or reverse magnetic force 66, 74 decreases in magnitude. As such, by varying the current 62 through each of the electromagnetic coils 58, the peg 36 may be maintained at a particular position. Moreover, the current 62 in the electromagnetic coils 58 may be reversed to generate opposite magnetic forces 72. As should be appreciated, although two electromagnetic coils 58 are shown in FIG. 5, the series of electromagnetic coils 58 may include any suitable number of electromagnetic coils 58 for each peg 36. Further, in some embodiments, one or more of the electromagnetic coils 58 may surround a group of pegs 36 to induce magnetic forces 66, 74 to multiple pegs 36 simultaneously.

Furthermore, the tension force 68 of the display screen 24 may also be accounted for when determining the currents 62. For example, the tension force 68 may be added to the reverse magnetic force 74 when balancing the forward magnetic force 66 to achieve a particular position for the peg 36. Moreover, the positions of surrounding pegs 36 may be used to more accurately determine the tension force 68. Furthermore, in some embodiments, the magnetic forces 66, 74 may be significantly larger (e.g., by 1, 2, 3, or more orders of magnitude) than the tension force 68, depending on the magnitudes of the currents 62. As such, the tension force 68 may be disregarded depending on implementation.

As discussed above, the peg coils 80 may interact with the electromagnetic fields 64A, 64B to facilitate respective magnetic forces 66, 74 on the peg 36. The peg coils 80 may be disposed at equal distances from each other on the peg 36 and/or may be concentrated in certain areas of the peg 36 and provided with uneven spacing relative to one another. Further, the peg coils 80 may include various thicknesses along the length of the peg 36. Thicker pegs coils 80 and/or increased concentrations of peg coils 80 may directly increase the magnitude of the magnetic forces 66, 74 on the peg 36. As such, varying the position, concentration, and/or thickness of peg coils 80 on the peg 36 may allow for more specific control of the of peg movement.

Figure 6:
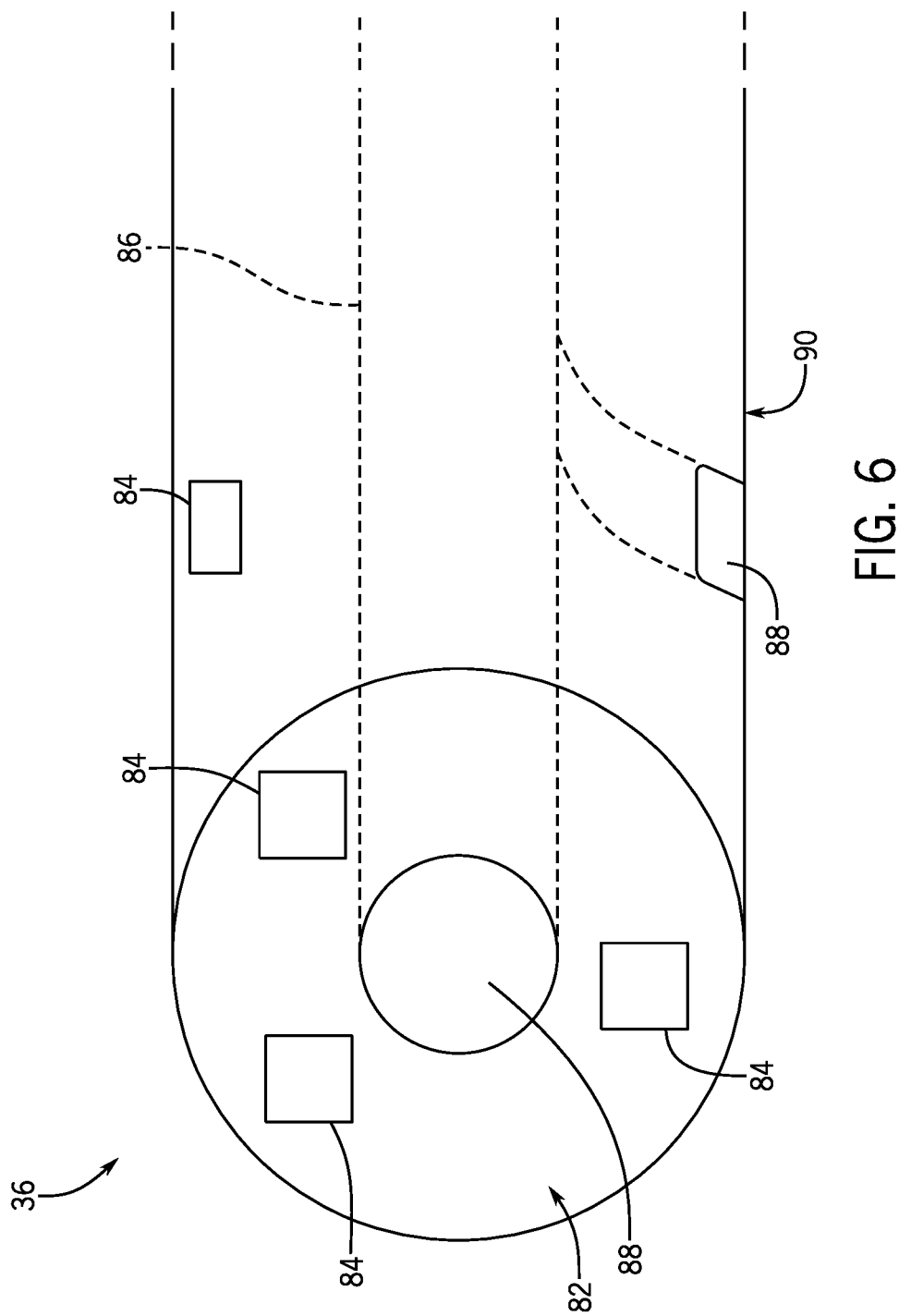
FIG. 6 is a schematic view of an example peg 36 with various techniques for displaying images, in accordance with aspects of the present disclosure.

The pegs 36 may also include a light source as part of the optics generator 30. FIG. 6 is a schematic view of an example peg 36 with various techniques for displaying images. As should be appreciated, although shown as having a cylindrical profile and a circular end face 82, the peg 36 may be of any suitable shape such as cylindrical, rectangular, conical, etc. In some embodiments, each peg 36 may produce light equivalent of a pixel of a display. For example, the end face 82 of each peg 36 may abut the display screen 24 and produce a light emission such that, in the aggregate, the pegs 36 of the peg array 26 form a desired image. The light emission may originate from one or more LEDs 84 and/or through the use of fiber optics. For example, a fiber optic cable 86 may have a terminal end 88 on the end face 82 of the peg 36. As such, the light traveling through the fiber optic cable 86 may be emitted from the end face 82 of the peg 36 and onto the display screen 24. Wiring for the LEDs 84 and/or the fiber optic cable 86 may be disposed within the peg 36 and/or along an exterior surface of the peg 36 for connection to an optics driver and/or the optics controller 22. Additionally or alternatively, LEDs 84 and/or terminal ends 88 of the fiber optic cable 86 may be disposed along the side 90 of the peg 36 to emit light transverse to the end face 82 of the peg 36. Light emissions from the side 90 of the pegs 36 may allow for improved illumination of the display screen 24, for example, when some pegs 36 are extended significantly past adjacent pegs 36. As such, shadows and/or illuminated portions of the image may be more accurately displayed. Additionally or alternatively, the display screen 24 may include permanent or semi-permanent image features on the viewing side 34 such as paint, texturing, or other suitable aesthetics depending on implementation. Moreover, although stated herein as used with lighting effects and/or an optical generator 30, as should be appreciated, the peg array 26 and peg driving system 28 may be implemented without lighting effects and, instead, provide dynamic 3D topographies separate from displayed images.

Figure 7:
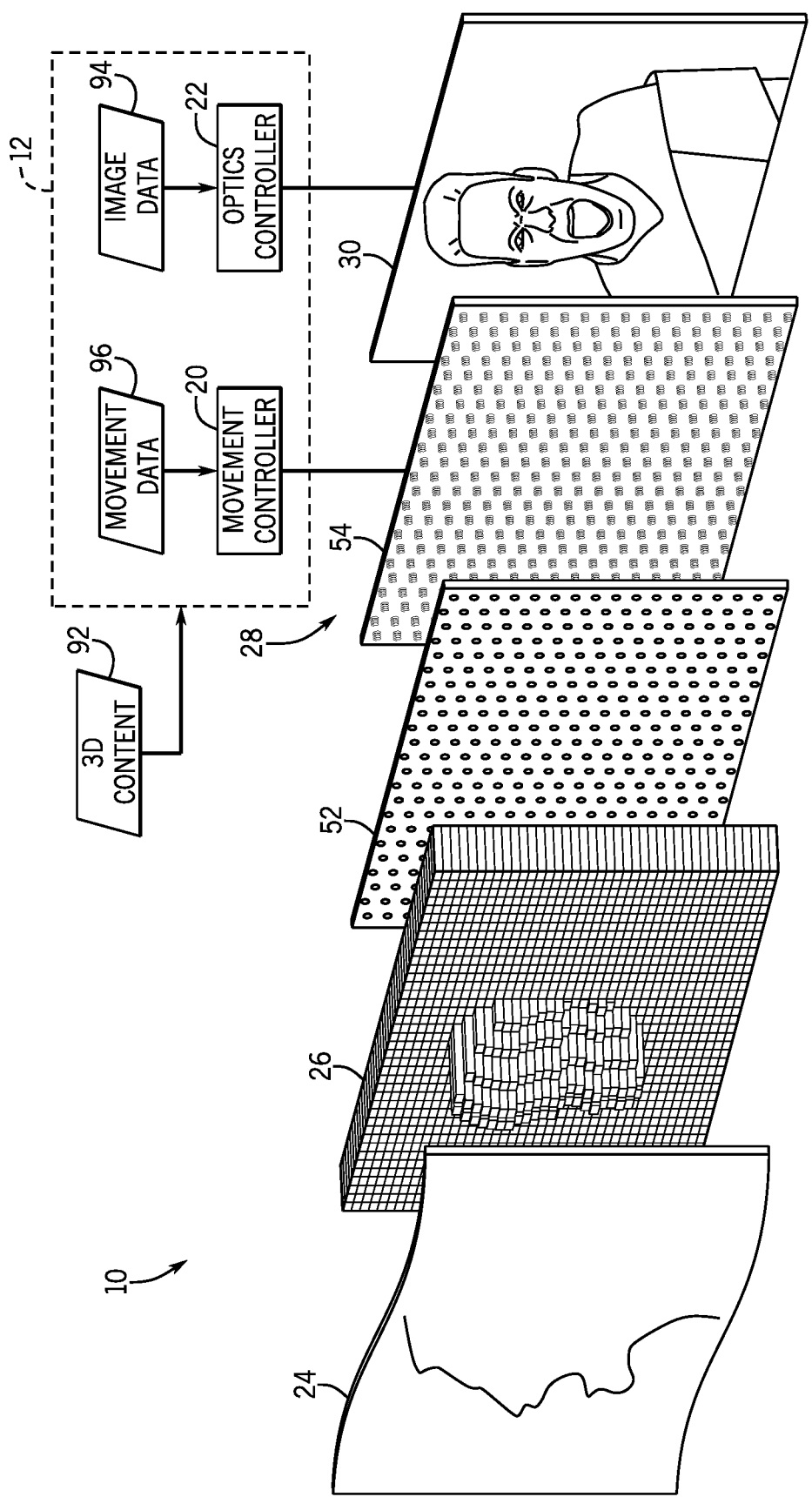
FIG. 7 is a schematic view of the example 3D display system of FIG. 1, in accordance with aspects of the present disclosure.

The controller 12 may receive 3D content 92 and generate the image data 94 and the movement data 96 for the optics generator 30 and the induction array 54, as shown in FIG. 7. For example, the 3D content 92 may be broken down into 2D imagery and a height map corresponding to a particular topography of the peg array 26. For example, in one embodiment, the 3D content 92 may be broken down into multiple components for processing and/or implementation. For example, the 3D content may include four data components for each pixel such as a red component, green component, blue component, and a greyscale component. In one embodiment, the red, green, and blue components may represent an RGB color space to be utilized by the optics controller 22 and the greyscale component may represent an amount of displacement from the neutral position 40. As should be appreciated, any suitable components may be used such as chromatic color spaces, gamma color spaces, etc.

In some embodiments, the image data 94 corresponding to the 2D imagery (e.g., RGB) may be processed by the controller 12 and/or the optics controller 22 into a format suitable for projection by the light sources (e.g., LEDs and/or fiber optics) of the pegs 36. For example, the optics controller 22 may convert the image data 94 into a resolution compatible with the peg array 26. Moreover, the optics controller 22 may drive the optics generator 30 to power the light sources. Similarly, the movement controller 20 may convert the movement data 96, including the height map, into a format viable for the peg array 26 to simulate. Additionally, the movement controller 20, may drive the currents 62 through the electromagnetic coils 58 based on the movement data 96 to position the individual pegs 36.

Figure 8:
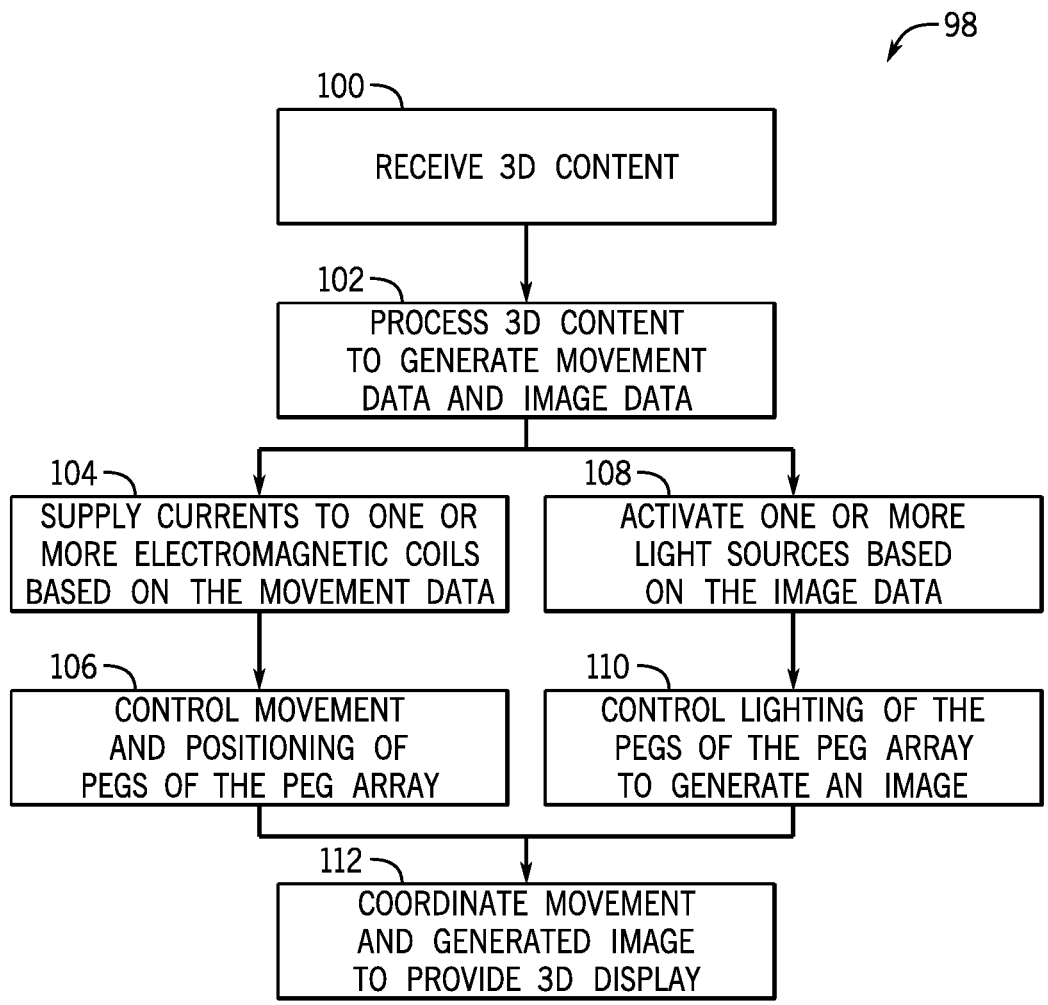
FIG. 8 is a flowchart of an example process for implementing the 3D display system of FIG. 1, in accordance with aspects of the present disclosure.

FIG. 8 is a flowchart of an example process 98 for implementing the 3D display system 10. The 3D display system 10 may receive 3D content desired to be displayed (process block 100) and, from the 3D content, generate movement data 96 and image data 94 compatible with the peg array 26 (process block 102). Additionally, the movement data 96 may be used to supply currents 62 to one or more electromagnetic coils of the induction array 54 (process block 104). The currents 62 in the electromagnetic coils 58 may induce electromagnetic fields 64, which may cause magnetic forces 66, 74 acting on the pegs 36. As such, the currents 62 may be varied to control the movement and positioning of the individual pegs 36 of the peg array 26 (process block 106). The movement and positioning of the pegs 36 may, in turn, create protrusions 42 on the display screen 24 for a more realistic 3D effect. Additionally, one or more light sources (e.g., LEDs, fiber optics, etc.) may be activated based on the image data 94 (process block 108). The light sources within and/or affixed to the pegs 36 may be controlled to, in the aggregate, generate an image (process block 110), for example, on the display screen 24. Moreover, the control of the movement and the generated image may be coordinated such that the topography of the peg array 26 or the display screen 24 corresponds to the displayed imagery (process block 112). Furthermore, multiple images and topographies may be generated in series to provide a dynamic 3D display.

While only certain features of the invention have been illustrated and described herein, many modifications and changes will occur to those skilled in the art. It is, therefore, to be understood that the appended claims are intended to cover all such modifications and changes as fall within the true spirit of the invention. Furthermore, although the above referenced flowchart of the process 98 is shown in a given order, in certain embodiments, the depicted steps may be reordered, altered, deleted, and/or occur simultaneously. Additionally, the referenced flowchart of the process 98 is given as an illustrative tool, and further decision and/or process blocks may be added depending on implementation.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A three-dimensional (3D) display system comprising:
a peg array comprising a plurality of pegs, wherein each peg of the plurality of pegs is individually addressable and configured to move along at least one axis;
an induction array comprising a plurality of electromagnetic coils configured to generate electromagnetic fields, wherein the electromagnetic fields are configured to induce magnetic forces upon at least one peg of the plurality of pegs to cause the at least one peg of the plurality of pegs to move along the at least one axis into an actuated position, wherein the induction array comprises a first electromagnetic coil of the plurality of electromagnetic coils and a second electromagnetic coil of the plurality of electromagnetic coils, wherein the first electromagnetic coil of the plurality of electromagnetic coils is configured to generate a first electromagnetic field, and wherein the second electromagnetic coil of the plurality of electromagnetic coils is configured to generate a second electromagnetic field opposite the first electromagnetic field; and
a display screen configured to be distended into a 3D topography via contact with the at least one peg of the plurality of pegs in the actuated position.

2. The 3D display system of claim 1, wherein the first electromagnetic field is configured to induce a first magnetic force upon the at least one peg of the plurality of pegs to motivate the at least one peg of the plurality of pegs in a first direction along the at least one axis, wherein the second electromagnetic field is configured to induce a second magnetic force upon the at least one peg of the plurality of pegs to motivate the at least one peg of the plurality of pegs in a second direction opposite the first direction along the at least one axis such that the first magnetic force and the second magnetic force hold the at least one peg of the plurality of pegs in equilibrium in the actuated position.

3. The 3D display system of claim 1, comprising a controller configured to drive electric current through at least one electromagnetic coil of the plurality of electromagnetic coils corresponding to the at least one peg of the plurality of pegs to generate the electromagnetic fields, wherein the controller is configured to vary the electric current to change a position of the at least one peg of the plurality of pegs.

4. The 3D display system of claim 1, wherein the at least one peg of the plurality of pegs comprises one or more peg coils configured to interact with the electromagnetic fields to induce the magnetic forces on the at least one peg of the plurality of pegs.

5. The 3D display system of claim 1, comprising an optics generator configured to facilitate a display of imagery on the display screen.

6. The 3D display system of claim 5, wherein the optics generator comprises a projector.

7. The 3D display system of claim 5, wherein the optics generator comprises a light source within or affixed to an end face of the at least one peg of the plurality of pegs, wherein the end face of the at least one peg of the plurality of pegs is configured to contact the display screen.

8. The 3D display system of claim 1, comprising an alignment support comprising a plurality of apertures through which the plurality of pegs are configured to actuate, wherein the at least one peg of the plurality of pegs is configured to actuate through a corresponding at least one aperture of the plurality of apertures along the at least one axis.

9. The 3D display system of claim 1, wherein the induced magnetic forces upon the at least one peg of the plurality of pegs are counterbalanced by a tension force exerted on the at least one peg of the plurality of pegs by the display screen.

10. The 3D display system of claim 1, wherein the display screen comprises an elastic material having a transmissivity greater than 50 percent.

11. A three-dimensional (3D) display comprising:
a peg array comprising a plurality of pegs;
a peg driving system configured to actuate at least one peg of the plurality of pegs from a first position to a second position such that the peg array forms a particular topography;
an optics generator configured to emit light from a surface of one or more pegs of the plurality of pegs, wherein the emitted light from the one or more pegs of the pegs of the plurality of pegs forms an image corresponding to the particular topography; and
a display screen disposed between a viewing area and the peg array and in contact with the peg array such that the particular topography is perceptible via one or more protrusions from the display screen and such that the image is transmitted through the display screen.

12. The 3D display of claim 11, wherein the peg driving system comprises an induction array comprising a plurality of electromagnetic coils configured to induce magnetic forces upon the at least one peg of the plurality of pegs, wherein the at least one peg of the plurality of pegs is configured to move relative to the plurality of electromagnetic coils when actuated from the first position to the second position.

13. The 3D display of claim 11, wherein the at least one peg of the plurality of pegs comprises a plurality of peg coils disposed on or in the at least one peg of the plurality of pegs and that actuate together with the at least one peg of the plurality of pegs, wherein a concentration of the peg coils, a thickness of the peg coils, or both vary along a length of the at least one peg of the plurality of pegs.

14. The 3D display of claim 11, wherein the peg driving system comprises a reinforced printed circuit board (rPCB).

15. The 3D display of claim 11, wherein the optics generator comprises one or more light emitting diodes (LEDs) disposed on the surface of the one or more pegs of the plurality of pegs and configured to emit light corresponding to a portion of the image.

16. The 3D display of claim 11, wherein the optics generator comprises a plurality of fiber optic cables configured to emit light corresponding to a portion of the image, each fiber optic cable of the plurality of fiber optic cables terminating at corresponding surfaces of the one or more pegs of the plurality of pegs.

17. The 3D display of claim 11, wherein the surface of the one or more pegs of the plurality of pegs comprises an end face, a side face, or both of the one or more pegs of the plurality of pegs.

18. A method for providing a three-dimensional (3D) display comprising:
supplying current to one or more electromagnetic coils configured to induce magnetic forces on one or more magnetic peg coils of one or more pegs of a peg array, wherein the induced magnetic forces motivate the one or more pegs of the peg array to positions associated with a topography;

illuminating one or more light sources disposed on a tip, side, or both of the one or more pegs of the peg array, wherein the one or more light sources are configured to display at least a portion of an image; and coordinating movement of the one or more pegs of the peg array and illumination of the one or more light sources such that the image corresponding to the topography is displayed while the one or more pegs of the peg array are in the positions associated with the topography.

19. The method of claim 18, comprising receiving 3D content and processing the 3D content into movement data and image data, wherein the movement of the one or more pegs of the peg array is based on the movement data and the illumination of the one or more light sources is based on the image data.

\* \* \* \* \*